US012783247B2

(12) United States Patent
Yao

(10) Patent No.: US 12,783,247 B2
(45) Date of Patent: Nov. 3, 2026

(54) INSTRUCTION PROCESSING METHOD INVOLVING BRANCH PREDICTION ERROR HANDLING, PROCESSOR, ELECTRONIC APPARATUS AND STORAGE MEDIUM

(71) Applicant: Beijing ESWIN Computing Technology Co., Ltd., Beijing (CN)

(72) Inventor: Yongbin Yao, Beijing (CN)

(73) Assignee: Beijing ESWIN Computing Technology Co., Ltd., Beijing (CN)

( * ) Notice: Subject to any disclaimer, the term of this patent is extended or adjusted under 35 U.S.C. 154(b) by 0 days.

(21) Appl. No.: 18/935,154

(22) Filed: Nov. 1, 2024

(65) Prior Publication Data

US 2025/0147769 A1 May 8, 2025

(30) Foreign Application Priority Data

Nov. 3, 2023 (CN) ........................ 202311458707.2

(51) Int. Cl.
*G06F 9/38* (2018.01)

(52) U.S. Cl.
CPC .......... *G06F 9/3861* (2013.01); *G06F 9/3804* (2013.01); *G06F 9/3844* (2013.01)

(58) Field of Classification Search
CPC ..................................................... G06F 9/3861
See application file for complete search history.

(56) References Cited

U.S. PATENT DOCUMENTS

2003/0182543 A1* 9/2003 Keller .................... G06F 9/3808 712/237
2004/0139281 A1* 7/2004 McDonald .......... G06F 12/0875 711/158
2006/0095750 A1* 5/2006 Nye ....................... G06F 9/3848 712/240
2018/0121200 A1* 5/2018 Chou ..................... G06F 9/3808
2021/0311744 A1* 10/2021 Gong .................... G06F 9/3804

FOREIGN PATENT DOCUMENTS

CN 102360282 A 2/2012

OTHER PUBLICATIONS

Chinese First Office Action corresponding to CN Application No. 202311458707.2, dated Aug. 31, 2026, with English Translation, 16 pages.

* cited by examiner

*Primary Examiner* — Michael J Metzger
(74) *Attorney, Agent, or Firm* — LEASON ELLIS LLP

(57) ABSTRACT

A method for processing an instruction, a processor, an electronic apparatus and a storage medium are provided. The method for processing the instruction includes: writing an instruction stream into an instruction data cache and a branch prediction error determination unit in parallel in an instruction processing pipeline, and determining a branch instruction in the instruction stream and whether a branch prediction error exists for the branch instruction in the branch prediction error determination unit; and in response to the branch prediction error existing for the branch instruction, performing a flush operation on an object instruction in the instruction processing pipeline that is fetched due to the branch prediction error.

18 Claims, 3 Drawing Sheets

INSTRUCTION PROCESSING METHOD INVOLVING BRANCH PREDICTION ERROR HANDLING, PROCESSOR, ELECTRONIC APPARATUS AND STORAGE MEDIUM

CROSS-REFERENCE TO RELATED APPLICATION

The present application claims priority of the Chinese Patent Application No. 202311458707.2, filed Nov. 3, 2023, the disclosure of which is incorporated herein by reference in its entirety as part of the present application.

TECHNICAL FIELD

Embodiments of the present disclosure relate to a method for processing an instruction, a processor, an electronic apparatus and a storage medium.

BACKGROUND

A processor is the core component in a computer, which executes computer instructions and processes data. It can perform a variety of arithmetic, logical, and control operations to accomplish specific tasks based on the instructions in the instruction stream.

An instruction stream is a sequence of computer instructions that tells the processor what operations it should perform. The instruction stream may come from a memory of the computer, from external devices, or from other sources. The processor accomplishes a specific computational task by reading the instructions in the instruction stream one by one and performing the operations required by the instructions.

SUMMARY

At least one embodiment of the present disclosure provides a method for processing an instruction, which includes: writing an instruction stream into an instruction data cache and a branch prediction error determination unit in parallel in an instruction processing pipeline, and determining a branch instruction in the instruction stream and whether a branch prediction error exists for the branch instruction in the branch prediction error determination unit; and in response to the branch prediction error existing for the branch instruction, performing a flush operation on an object instruction in the instruction processing pipeline that is fetched due to the branch prediction error.

For example, in the method for processing the instruction according to at least one embodiment of the present disclosure, determining a branch instruction in the instruction stream and whether a branch prediction error exists for the branch instruction includes: performing a first instruction segmentation on the instruction stream written into the branch prediction error determination unit to obtain a first set of instructions; in response to the branch instruction existing in the first set of instructions, computing a computation target address of the branch instruction, and checking whether the computation target address is consistent with a branch prediction target address for the branch instruction; and in response to the computation target address being inconsistent with the branch prediction target address, determining that the branch prediction error exists for the branch instruction.

For example, in the method for processing the instruction according to at least one embodiment of the present disclosure, computing a computation target address of the branch instruction includes: computing the computation target address based on instruction jump information of the branch instruction.

For example, the method for processing the instruction according to at least one embodiment of the present disclosure further includes: in response to the branch prediction error existing, correcting a write pointer of the instruction data cache to move the write pointer to a location of the object instruction in the instruction data cache.

For example, the method for processing the instruction according to at least one embodiment of the present disclosure further includes: performing a second instruction segmentation on the instruction stream written into the instruction data cache to obtain a second set of instructions; and reading the second set of instructions and in response to the second set of instructions including the object instruction, blocking an execution of the object instruction.

For example, in the method for processing the instruction according to at least one embodiment of the present disclosure, performing a second instruction segmentation on the instruction stream written into the instruction data cache to obtain a second set of instructions includes: reading first control information of the instruction stream from the instruction data cache; performing an instruction segmentation on the instruction stream based on the first control information to obtain location information in the instruction data cache for each instruction in the second set of instructions; and providing the location information to enable reading the second set of instructions from the instruction data cache based on the location information for decoding.

For example, in the method for processing the instruction according to at least one embodiment of the present disclosure, in response to the second set of instructions including the object instruction, blocking an execution of the object instruction includes: reading the second set of instructions from the instruction data cache based on the location information via a data path from the instruction data cache to a decoding unit; in response to the second set of instructions including the object instruction, marking the object instruction as an invalid state; and in response to the invalid state, disabling a decoding operation for the object instruction or decoding the object instruction as an invalid instruction.

For example, the method for processing the instruction according to at least one embodiment of the present disclosure further includes: in response to the second set of instructions not including the object instruction, continuing an execution of each instruction in the second set of instructions.

For example, the method for processing the instruction according to at least one embodiment of the present disclosure further includes: performing an instruction fetch operation to acquire the instruction stream in the instruction processing pipeline.

For example, in the method for processing the instruction according to at least one embodiment of the present disclosure, performing an instruction fetch operation to acquire the instruction stream includes: in response to receiving an instruction acquisition request, based on a tag part of a destination address included in the instruction acquisition request, querying a tag memory of an instruction cache to determine whether the tag part hits the tag memory; in response to the tag part hitting the tag memory, reading instruction data corresponding to the instruction acquisition request from a data memory of the instruction cache as the instruction stream; or in response to the tag part not hitting the tag memory, reading instruction data corresponding to the instruction acquisition request from a main memory or a next level cache.

For example, in the method for processing the instruction according to at least one embodiment of the present disclosure, the instruction stream includes one or more non-fix length instructions.

At least one embodiment of the present disclosure provides a processor, which includes an instruction data cache, an instruction stream transmission unit, and a branch prediction error determination unit, where the instruction stream transmission unit is configured to write an instruction stream into the instruction data cache and the branch prediction error determination unit in parallel in an instruction processing pipeline; and the branch prediction error determination unit is configured to: determine a branch instruction in the instruction stream and whether a branch prediction error exists for the branch instruction; and in response to the branch prediction error existing for the branch instruction, perform a flush operation on an object instruction in the instruction processing pipeline that is fetched due to the branch prediction error.

For example, in the processor according to at least one embodiment of the present disclosure, the branch prediction error determination unit includes: a first instruction segmentation unit, configured to perform a first instruction segmentation on the instruction stream written into the branch prediction error determination unit to obtain a first set of instructions; and a branch result computation and checking unit, configured to, in response to the branch instruction existing in the first set of instructions, compute a computation target address of the branch instruction, and check whether the computation target address is consistent with a branch prediction target address for the branch instruction; and in response to the computation target address being inconsistent with the branch prediction target address, determine that the branch prediction error exists for the branch instruction.

For example, in the processor according to at least one embodiment of the present disclosure, the branch result computation and checking unit is further configured to compute the computation target address based on instruction jump information of the branch instruction.

For example, in the processor according to at least one embodiment of the present disclosure, the branch prediction error determination unit is further configured to: in response to the branch prediction error existing, correct a write pointer of the instruction data cache to move the write pointer to a location of the object instruction in the instruction data cache.

For example, the processor according to at least one embodiment of the present disclosure further includes: a second instruction segmentation unit, configured to perform a second instruction segmentation on an instruction stream written into the instruction data cache to obtain a second set of instructions; and a block unit, configured to read the second set of instructions and in response to the second set of instructions including the object instruction, block an execution of the object instruction.

For example, in the processor according to at least one embodiment of the present disclosure, the second instruction segmentation unit is further configured to: read first control information of the instruction stream from the instruction data cache; perform an instruction segmentation on the instruction stream based on the first control information to obtain location information in the instruction data cache for each instruction in the second set of instructions; and provide the location information to enable reading the second set of instructions from the instruction data cache based on the location information for decoding.

For example, in the processor according to at least one embodiment of the present disclosure, the block unit includes: a reading unit, configured to read the second set of instructions from the instruction data cache based on the location information via a data path from the instruction data cache to a decoding unit; a marking unit, configured to, in response to the second set of instructions including the object instruction, mark the object instruction as an invalid state; and a decoding unit, configured to, in response to the invalid state, disable a decoding operation for the object instruction or decode the object instruction as an invalid instruction.

For example, in the processor according to at least one embodiment of the present disclosure, the block unit is further configured to: in response to the second set of instructions not including the object instruction, continue an execution of each instruction in the second set of instructions.

For example, the processor according to at least one embodiment of the present disclosure includes: an instruction fetch unit, configured to perform an instruction fetch operation to acquire the instruction stream in the instruction processing pipeline.

For example, in the processor according to at least one embodiment of the present disclosure, the instruction fetch unit is further configured to: in response to receiving an instruction acquisition request, based on a tag part of a destination address included in the instruction acquisition request, query a tag memory of an instruction cache to determine whether the tag part hits the tag memory; in response to the tag part hitting the tag memory, read instruction data corresponding to the instruction acquisition request from a data memory of the instruction cache as the instruction stream; or in response to the tag part not hitting the tag memory, read instruction data corresponding to the instruction acquisition request from a main memory or a next level cache.

For example, in the processor according to at least one embodiment of the present disclosure, the instruction stream includes one or more non-fix length instructions.

At least one embodiment of the present disclosure provides an electronic apparatus, which includes: at least one processor; at least one memory storing one or more computer program modules; where the one or more computer program modules are configured to be executed by the at least one processor to implement the method for processing the instruction according to at least one embodiment of the present disclosure.

At least one embodiment of the present disclosure provides a non-transitory computer-readable storage medium storing computer executable instructions, where the computer executable instructions, upon being executed by one or more processors, implement the method for processing the instruction according to at least one embodiment of the present disclosure.

BRIEF DESCRIPTION OF DRAWINGS

To more clearly illustrate the embodiments of the present disclosure, the drawings required to be used for the embodiments are briefly described in the following. It is obvious that the described drawings are only some embodiments of the present disclosure, and therefore should not be regarded as limiting the scope.

DETAILED DESCRIPTION

Figure 1:
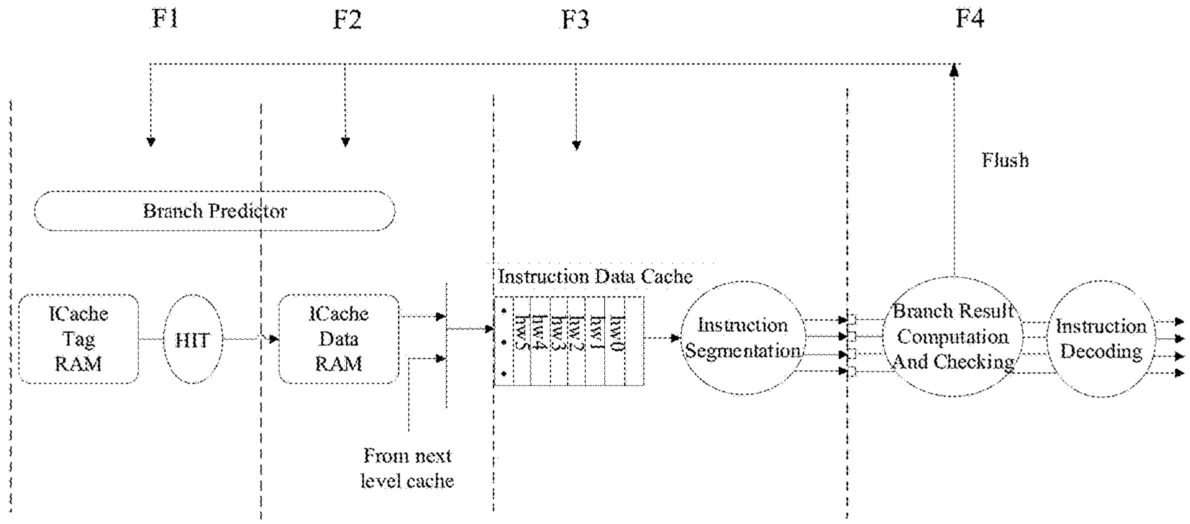
FIG. 1 is a schematic diagram of an exemplary pipeline.

The embodiments of the disclosure are exemplified in the drawings, and reference will now be made in detail to specific the embodiments of the present disclosure. Although the present disclosure will be described in connection with specific embodiments, it should be understood that it is not intended to limit the present disclosure to the described embodiments. Rather, it is intended to cover changes, modifications, and equivalents included within the spirit and scope of the present disclosure as defined by the appended claims. It should be noted that the method operations described herein may be implemented by any functional block or functional arrangement, and that any functional block or functional arrangement may be implemented as a physical entity or a logical entity, or a combination of both.

In order to provide those skilled in the art with a better understanding of the present disclosure, it is described in further detail below in connection with the drawings and specific embodiments.

It should be noted that the embodiments to be presented next are specific embodiments only, and do not limit the embodiments of the present disclosure must be the specific shapes, hardware, connectivity relationships, operations, values, conditions, data, sequences, and the like, that are illustrated and described. Those skilled in the art may apply the ideas of the disclosure by reading the specification to construct additional embodiments not mentioned herein.

The terms used in the disclosure are those generic terms that are currently widely used in the field in view of the functionality regarding the present disclosure, but these terms may be varied according to the intent of a person of ordinary skill in the art, precedent or new technology in the field. In addition, particular terms may be chosen by the applicant and, in such cases, the detailed meanings of the particular terms will be described in the detailed description of the present disclosure. Accordingly, the terms used in the specification should not be understood as simple names, but rather based on the meaning of the terms and the general description of the present disclosure.

Flowcharts are used in the present disclosure to illustrate the operations performed by the system according to the embodiments of the present disclosure. It should be understood that the preceding or following operations are not necessarily performed in an exact order. Instead, various steps may be processed in reverse order or concurrently, as desired. At the same time, other operations can be added to these procedures, or a certain step or steps can be removed from these procedures.

Firstly, the acronyms and related terms involved in the disclosure are defined and described.

Non-fix length instruction is a type of storage in which the length of each instruction is variable. Unlike a fix length instruction, the length of each instruction depends on the needs of the instruction itself. Because the length of each instruction is different, it takes more time for the computer to determine the location of the next instruction at runtime, thus affecting the speed of program execution. The non-fix length instruction is commonly used in CISC (Complex Instruction Set Computer) and some older computer architectures.

Fix length instruction is a type of storage in which each instruction occupies the same amount of space. In the computer, the length of an instruction is usually 4 bytes or 8 bytes, depending on the computer architecture. Because the length of each instruction is the same, it is easy for the computer to determine the location of the next instruction at runtime, thus speeding up program execution. The fix length instruction is commonly used in RISC (Reduced Instruction Set Computer) and some embedded systems.

It should be understood that the terms defined above are only exemplary definitions in a particular application scenario for a better understanding of the present disclosure, and the present disclosure is not limited thereby.

An exemplary pipeline phase of a processor typically includes the following phases:

1. Instruction fetch: fetching the next instruction from the instruction cache or main memory;
2. Instruction decode: decoding the instruction, and determining the required operation number and operation type;
3. Execution: executing the operation of the instruction, such as an arithmetic operation, a logical operation and so on;
4. Memory access: reading or writing the memory at the phase when the instruction needs to access the memory; and
5. Write back: writing back the execution result to the register file or the memory.

The processor may optimize the execution efficiency of the instruction stream in many ways, such as using pipelining technology to divide the instruction execution process into many phases and process many instructions simultaneously; using branch prediction technology to predict the execution path of branch instructions, etc.

For example, a branch instruction is a common type of control stream transfer instruction in a program, which determines the execution path of the program based on a certain condition. In order to improve the efficiency of the pipeline, the processor predicts the branch instruction in, for example, the phase of instruction fetch in order to fetch the predicted branch target instruction in advance. Branch prediction usually includes the following steps:

1. Branch target computation: computing the address of the branch target based on the condition of the branch instruction and the current value of program counter (PC);
2. Branch prediction: predicting the direction of the branch (i.e., whether the branch occurs or not) based on the history branch record and the result of the branch target computation; and
3. Branch target cache: saving the predicted branch target address into the branch target cache to directly fetch the branch target instruction in the phase of instruction fetch.

It should be noted that branch prediction is a predictive technique, which is not always accurate. When the prediction is incorrect, instructions already fetched in the pipeline may need to be discarded, thus wasting a certain amount of processor resources. Therefore, reducing the penalty for branch prediction errors is crucial to improve processor performance.

For example, in processors that support instructions (e.g., fix length or non-fix length instructions), it is common to use a queue to cache the instruction stream from the instruction fetch unit. Here, the queue is referred to as an instruction data queue or an instruction data cache. For example, the minimum instruction length for RISC-V and ARM is 16 bits, so the width of the queue is 16 bits; and the minimum instruction length for x86 is 8 bits, so the width of the queue is 8 bits. The decoding unit reads instruction data from the queue, performs instruction segmentation, and when it finds a branch instruction that jumps directly, then at this point it computes its destination address; and when it finds that the result of the branch instruction is inconsistent with the previously predicted result, it may flush in advance, thus reducing the penalty for branch prediction errors. But the correction of the branch instruction occurs after reading the instruction data cache. FIG. 1 gives a schematic of a pipeline of this typical design.

FIG. 1 illustrates a schematic of an exemplary pipeline.

Referring to FIG. 1, in the F1 phase, reading a tag random access memory (Icache Tag RAM for short) of the instruction cache and determining to be hit or not. In the F2 phase, based on the hit information, reading the data random access memory (Icache Data RAM for short) of the instruction cache, and when the instruction cache misses, reading the required instruction data from, for example, the next level cache.

For example, the Icache Tag RAM is a special type of random memory used to store the high level address of an instruction. It is used to store the high level address of an instruction for the purpose of comparing and determining whether the instruction is already in the instruction cache. For example, when the processor (e.g., CPU) requests an instruction, the instruction cache will use the high level address of the requested instruction address as a tag to look up in the tag random access memory. When a matching tag is found, it means that the instruction is already in the instruction cache, and the instruction data may be read directly from the data random access memory of the instruction cache, or the instruction data needs to be acquired from the main memory or other auxiliary memories (e.g., the next level cache).

Then, the summarized instruction stream is written into the instruction data cache, and branch prediction also occurs in F1 and F2 phases, or in some decouple designs, the result of branch prediction is obtained before and go to the F3 phase with pipeline of F1 and F2. In the F3 phase, the instruction stream in the instruction data cache is read. For example, for a four-decode design, it is necessary to get eight 16-bit instruction streams and then perform instruction segmentation on them to get four instructions.

However, instruction segmentation from an instruction stream of non-fix length is time-consuming. For example, refer to FIG. 1, after getting the instruction stream byte 0, byte 1, byte 2, and byte 3 from the instruction data cache, it is necessary to determine which bytes belong to the same instruction so as to segment the instruction stream into instructions.

After obtaining the instruction after the segmentation in the F3 phase, the instruction is sent to the F4 phase. In the F4 phase, the branch instruction result may be computed and checked, and when an incorrectly predicted branch instruction is found, then a flush instruction is sent in the F4 phase to flush the instruction in F3/F2/F1 phases at this point.

In this design, even if the branch prediction error check is performed before the branch instruction is executed, it is still possible to detect the error and initiate the refresh only in the F4 phase at the earliest. In addition, depending on the downstream phase of the instruction data cache, the waiting time between when the instruction stream is written into the instruction data cache and when it can be read out for instruction segmentation may be long. For example, the fastest case may involve waiting for just one phase, and the slowest case may involve waiting for ten phases. This increases the penalty time of detecting a branch prediction error.

Therefore, in a processor supporting, for example, non-fix length instructions, when an instruction stream is read from an instruction data cache, instruction segmentation is performed, and then the target address of the branch prediction is checked, the latency will be longer, and increase the penalty of the branch prediction error.

At least one embodiment of the present disclosure provides a method for processing an instruction, a processor, an electronic apparatus, and a storage medium for earlier detection of, for example, a branch instruction prediction error. The branch prediction error can be detected, for example, before the instruction is segmented and decoded, and there is no need for a waiting time, greatly reducing the penalties caused by the branch prediction error.

Figure 2:
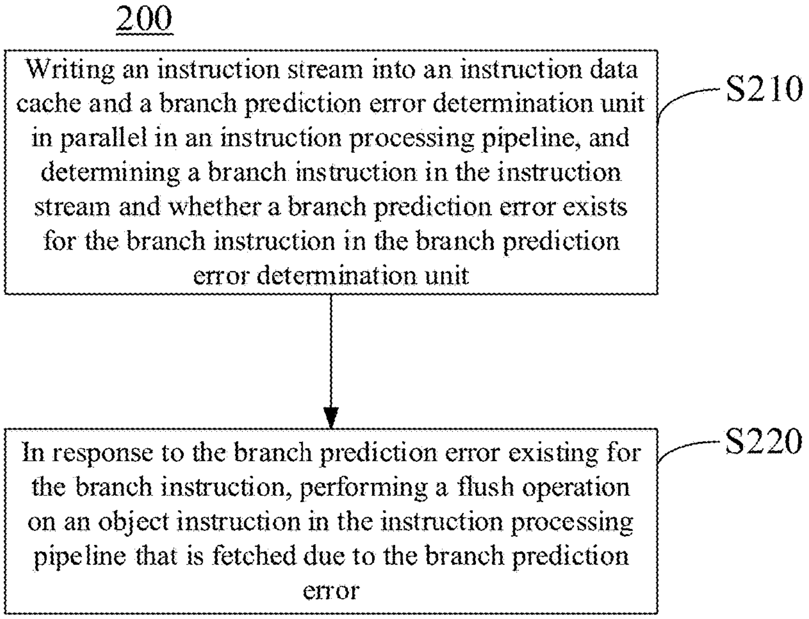
FIG. 2 is a flowchart of a method for processing an instruction according to at least one embodiment of the present disclosure.

FIG. 2 is a flowchart of a method for processing an instruction 200 according to at least one embodiment of the present disclosure. The method for processing the instruction 200 described with reference to FIG. 2 and additional aspects thereof may be implemented in a processor 300, an electronic apparatus, a hardware structure, a software structure, or a hardware structure and a software structure described below with reference to FIG. 3.

Referring to FIG. 2, the method for processing the instruction 200 includes steps S210 to S220.

In S210, writing an instruction stream into an instruction data cache and a branch prediction error determination unit in parallel in an instruction processing pipeline, and determining a branch instruction in the instruction stream and whether a branch prediction error exists for the branch instruction in the branch prediction error determination unit.

For example, the instruction processing pipeline may be any pipeline in which the processor processes instructions. For example, depending on the architecture of the processor, the instruction stream may be embodied in the form of byte, half word (hw), and the like. For example, the instruction stream may include a branch instruction, which may be used to implement control flow (i.e., executing a particular sequence of instructions only when some conditions are met) in a program loop and a conditional statement.

In S220, in response to the branch prediction error existing for the branch instruction, performing a flush operation on an object instruction in the instruction processing pipeline that is fetched due to the branch prediction error.

For example, the flush operation may empty or invalidate the object instruction (referred to as incorrectly fetched instruction) in the instruction processing pipeline that are fetched due to the branch prediction error, and send a correct target address (e.g., a target address computed based on the information of the branch instruction) to acquire the correct instruction from the memory.

As described above, the method for processing the instruction according to at least one embodiment of the present disclosure may enable earlier detection of the branch instruction prediction error, thereby improving processor performance.

For example, the method for processing the instruction according to at least one embodiment of the present disclosure may enable detection of the branch prediction error prior to instruction segmentation and decoding, and no waiting time is required, greatly reducing penalties caused by the branch prediction error.

Some exemplary additional aspects of the method for processing the instruction according to at least one embodiment of the present disclosure are described below.

For example, in the method for processing the instruction according to at least one embodiment of the present disclosure, determining a branch instruction in the instruction stream and whether a branch prediction error exists for the branch instruction includes: performing a first instruction segmentation on the instruction stream written into the branch prediction error determination unit to obtain a first set of instructions; and in response to the branch prediction error existing in the first set of instructions, computing a computation target address of the branch instruction, and checking whether the computation target address is consistent with a branch prediction target address for the branch instruction; in response to the computation target address being inconsistent with the branch prediction target address, determining that the branch prediction error exists for the branch instruction.

In some embodiments, the instruction stream may be segmented through the information included in the instruction stream to obtain a set of instructions. For example, in an instruction stream embodied in bytes, it may be determined whether the next byte and the current byte belong to an instruction based on identification information included in the current byte, thereby realizing instruction segmentation. Of course, the embodiments are not limited thereto, and instruction segmentation may be realized in other ways. For example, in a processor supporting fix length instructions, a fixed number of bytes may be divided into one instruction, such as dividing every two, four, or other number of bytes into one instruction.

In some embodiments, whether an instruction is a branch instruction may be determined based on information included in the instruction obtained after instruction segmentation. Of course, the present disclosure is not limited in this manner.

The computation target address may identify a correct target address for a branch instruction. In contrast, a branch prediction target address is a target address generated by a branch predictor for branch prediction for the branch instruction, and thus may be incorrect, and thus the correctness of the branch prediction may be determined by checking the consistency of the computation target address with the branch prediction target address.

In this way, the method for processing the instruction according to at least one embodiment of the present disclosure may determine whether there is a branch instruction in the instruction stream that is incorrectly predicted by branch instruction segmentation, branch result computation and checking.

For example, in the method for processing the instruction according to at least one embodiment of the present disclosure, computing a computation target address of a branch instruction includes: computing the computation target address based on instruction jump information of the branch instruction.

In some embodiments, the instruction jump information is a direct specification of the target address. For example, the target address to be jumped is directly specified in the branch instruction. This approach is suitable for situations where the target address is fixed, such as jumping to a particular subprogram or a fixed memory address.

In some embodiments, the instruction jump information is a relative address. For example, the relative address is used in a branch instruction, i.e., the jump is made relative to the address of the current instruction. This approach is suitable for situations where a relative jump is required in a program, such as a loop or a conditional judgment.

These ways may be selected and used in combination according to specific processor architectures and instruction sets to realize different jumping needs, and the present disclosure is not limited thereto.

In this way, the method for processing the instruction according to at least one embodiment of the present disclosure may facilitate the computation to obtain a computation target address.

For example, the method for processing the instruction according to at least one embodiment of the present disclosure further includes: in response to the branch prediction error existing, correcting a write pointer of the instruction data cache to move the write pointer to a location of the object instruction in the instruction data cache.

Thus, the correction of the write pointer may move the write pointer to a location in the instruction data cache where the instruction obtained by the fetch pointer due to the branch prediction error is located, whereby subsequent fetches will be rewritten directly from there for overwriting, thereby writing the correct instruction to the instruction data cache.

In this way, the method for processing the instruction according to at least one embodiment of the present disclosure may perform a correction operation earlier, facilitating the writing of the correct instruction to the instruction data cache.

For example, the method for processing the instruction according to at least one embodiment of the present disclosure further includes: performing the second instruction segmentation on the instruction stream written into the instruction data cache to obtain the second set of instructions; and reading the second set of instructions and in response to the second set of instructions including the object instruction, blocking an execution of the object instruction.

In some embodiments, the second instruction segmentation may be the same or similar to the first instruction segmentation.

In this way, the method for processing the instruction according to at least one embodiment of the present disclosure may perform instruction segmentation and block execution of the incorrectly fetched instruction, avoiding waste of processor resources and correct execution of the instruction sequence.

For example, in the method for processing the instruction according to at least one embodiment of the present disclosure, performing the second instruction segmentation on the instruction stream written into the instruction data cache to obtain the second set of instructions includes: reading first control information of the instruction stream from the instruction data cache; performing an instruction segmentation on the instruction stream based on the first control information to obtain the location information in the instruction data cache for each instruction in the second set of instructions; providing the location information to enable reading the second set of instructions from the instruction data cache based on the location information for decoding.

In this way, the method for processing the instruction according to at least one embodiment of the present disclosure may transmit only the location information of the instructions in the instruction data cache in the instruction stream to the decoding unit for decoding, reducing the overhead of data transmission.

For example, in the method for processing the instruction according to at least one embodiment of the present disclosure, blocking the execution of the object instruction in response to the second set of instructions including the object instruction includes: reading the second set of instructions from the instruction data cache based on the location information via a data path from the instruction data cache to the decoding unit; marking the object instruction as an invalid state in response to the second set of instructions including the object instruction; and, in response to the invalid state, disabling a decoding operation for the object instruction or decoding the object instruction as an invalid instruction.

In this manner, the method for processing the instruction according to at least one embodiment of the present disclosure may acquire the instruction directly from the instruction data cache via the data path, improving the efficiency of the decoding unit in reading the instruction, and realizing the blocking of the execution of the incorrectly fetched instruction by disabling the decoding operation for the incorrectly fetched instruction or decoding the incorrectly fetched instruction as an invalid instruction.

Of course, the blocking of the incorrectly fetched instruction is not limited to this, and the blocking of the execution of the incorrectly fetched instruction may be realized at the execution unit or other phases of the pipeline.

For example, the method for processing the instruction according to at least one embodiment of the present disclosure further includes: in response to the second set of instructions not including the object instruction, continuing the execution of the respective instructions in the second set of instructions.

In this way, the method for processing the instruction according to at least one embodiment of the present disclosure may continue the execution for the correct instructions, such as normally performing the decoding operation and the execution operation for the decoded instructions to facilitate the normal execution of the instructions.

For example, the method for processing the instruction according to at least one embodiment of the present disclosure further includes: performing an instruction fetch operation to acquire the instruction stream in the instruction processing pipeline.

In this way, the method for processing the instruction according to at least one embodiment of the present disclosure may realize the acquisition of the instruction stream.

For example, in the method for processing the instruction according to at least one embodiment of the present disclosure, performing the instruction fetch operation to acquiring the instruction stream includes: in response to receiving the instruction acquisition request, based on a tag part of a destination address included in the instruction acquisition request, querying a tag memory of an instruction cache to determine whether the tag part hits the tag memory; in response to the tag part hitting the tag memory, reading instruction data corresponding to the instruction acquisition request from a data memory of the instruction cache as the instruction stream; or in response to the tag part not hitting the tag memory, reading instruction data corresponding to the instruction acquisition request from a main memory or a next level cache.

In this way, the method for processing the instruction according to at least one embodiment of the present disclosure may realize the acquisition of the instruction stream by reading from the cache, the main memory, or the next level cache.

For example, the method for processing the instruction according to at least one embodiment of the present disclosure, the instruction stream includes one or more non-fix length instructions.

In this way, the method for processing the instruction according to at least one embodiment of the present disclosure may be applicable to application scenarios in which the instruction stream includes a non-fix length instruction. For example, the instruction segmentation for the non-fix length instruction is time-consuming, and in such application scenarios, it would be advantageous to detect branch prediction errors prior to instruction segmentation and decoding.

Of course, embodiments are not limited thereto, and the method for processing the instruction according to at least one embodiment of the present disclosure may likewise be applicable to application scenarios in which the instruction stream includes a fix length instruction.

Correspondingly to the method for processing the instruction 200 according to at least one embodiment of the present disclosure, at least one embodiment of the present disclosure further provides a processor.

Figure 3:
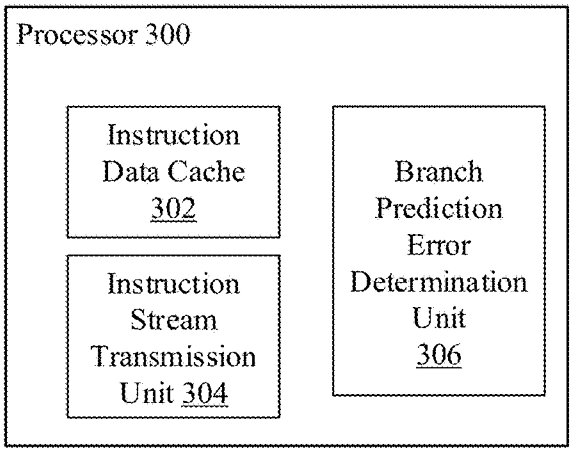
FIG. 3 is a schematic diagram of a processor according to at least one embodiment of the present disclosure.

FIG. 3 is a schematic diagram of a processor 300 according to at least one embodiment of the present disclosure.

Referring to FIG. 3, the processor 300 according to at least one embodiment of the present disclosure includes an instruction data cache 302, an instruction stream transmission unit 304, and a branch prediction error determination unit 306. Of course, the embodiment is not limited thereto, and the processor 300 according to at least one embodiment of the present disclosure may additionally include a branch predictor, a decoding unit, an execution unit, and the like.

The instruction stream transmission unit 304 is configured to write the instruction stream into the instruction data cache 302 and the branch prediction error determination unit 306 in parallel in an instruction processing pipeline.

The branch prediction error determination unit 306 is configured to determine branch instructions in the instruction stream and whether a branch prediction error exists for the branch instruction in the branch prediction error determination unit; and, in response to the branch prediction error existing for the branch instruction, perform a flush operation on an object instruction in the instruction processing pipeline that is fetched due to the branch prediction error.

As described above, the processor according to at least one embodiment of the present disclosure may enable the detection of the branch instruction prediction error to be performed earlier, thereby improving the performance of the processor.

Some exemplary additional aspects of a processor according to at least one embodiment of the present disclosure are described below.

For example, in the processor according to at least one embodiment of the present disclosure, the branch prediction error determination unit includes: a first instruction segmentation unit, configured to perform a first instruction segmentation on the instruction stream written into the branch prediction error determination unit to obtain a first set of instructions; and a branch result computation and checking unit, configured to, in response to the branch instruction existing in the first set of instructions, compute a computation target address of the branch instruction, and check whether the computation target address is consistent with a branch prediction target address for the branch instruction; and in response to the computation target address being inconsistent with the branch prediction target address, determine that the branch prediction error exists for the branch instruction.

For example, in the processor according to at least one embodiment of the present disclosure, the branch result computation and checking unit is further configured to compute the computation target address based on instruction jump information of the branch instruction.

For example, in the processor according to at least one embodiment of the present disclosure, the branch prediction error determination unit is further configured to: in response to the branch prediction error existing, correct a write pointer of the instruction data cache to move the write pointer to a location of the object instruction in the instruction data cache.

For example, the processor according to at least one embodiment of the present disclosure further includes: a second instruction segmentation unit, configured to perform a second instruction segmentation on an instruction stream written into the instruction data cache to obtain a second set of instructions; and a block unit, configured to read the second set of instructions and in response to the second set of instructions including the object instruction, block an execution of the object instruction.

In some embodiments, the block unit may include units downstream of instruction segmentation within the pipeline, such as a decoding unit and/or an execution unit, etc., as long as they can block the execution of the object instruction.

For example, in the processor according to at least one embodiment of the present disclosure, the second instruction segmentation unit is further configured to: read first control information of the instruction stream from the instruction data cache; perform an instruction segmentation on the instruction stream based on the first control information to obtain location information in the instruction data cache for each instruction in the second set of instructions; and provide the location information to enable reading the second set of instructions from the instruction data cache based on the location information for decoding.

For example, in the processor according to at least one embodiment of the present disclosure, the block unit includes: a reading unit, configured to read the second set of instructions from the instruction data cache based on the location information via a data path from the instruction data cache to a decoding unit; a marking unit, configured to, in response to the second set of instructions including the object instruction, mark the object instruction as an invalid state; and a decoding unit, configured to, in response to the invalid state, disable a decoding operation for the object instruction or decode the object instruction as an invalid instruction.

For example, in the processor according to at least one embodiment of the present disclosure, the block unit is further configured to: in response to the second set of instructions not including the object instruction, continue an execution of each instruction in the second set of instructions.

For example, the processor according to at least one embodiment of the present disclosure includes: an instruction fetch unit, configured to perform an instruction fetch operation to acquire the instruction stream in the instruction processing pipeline.

For example, in the processor according to at least one embodiment of the present disclosure, the instruction fetch unit is further configured to: in response to receiving an instruction acquisition request, based on a tag part of a destination address included in the instruction acquisition request, query a tag memory of an instruction cache to determine whether the tag part hits the tag memory; in response to the tag part hitting the tag memory, read instruction data corresponding to the instruction acquisition request from a data memory of the instruction cache as the instruction stream; or in response to the tag part not hitting the tag memory, read instruction data corresponding to the instruction acquisition request from a main memory or a next level cache.

For example, in the processor according to at least one embodiment of the present disclosure, the instruction stream includes one or more non-fix length instructions.

The above additional aspects of the processor 300 according to at least one embodiment of the present disclosure may correspond to the additional aspects of the method for processing the instruction 200 according to at least one embodiment of the present disclosure, and thus the technical effects of the additional aspects of the method for processing the instruction 200 according to at least one embodiment of the present disclosure may likewise correspond to the additional aspects of the processor 300 according to at least one embodiment of the present disclosure, as will herein be will not be repeated herein.

One or more exemplary aspects as described above in conjunction with FIG. 2 and FIG. 3 are described below in connection with exemplary application scenarios. It should be appreciated that the exemplary application scenarios described below are merely exemplary and not limiting, and are intended to implement one or more aspects as described above in conjunction with FIG. 2 and FIG. 3 in specific application scenarios, and that aspects described below in conjunction with the exemplary application scenarios may be combined with one or more aspects as described above in conjunction with FIG. 2 and FIG. 3.

Figure 4:
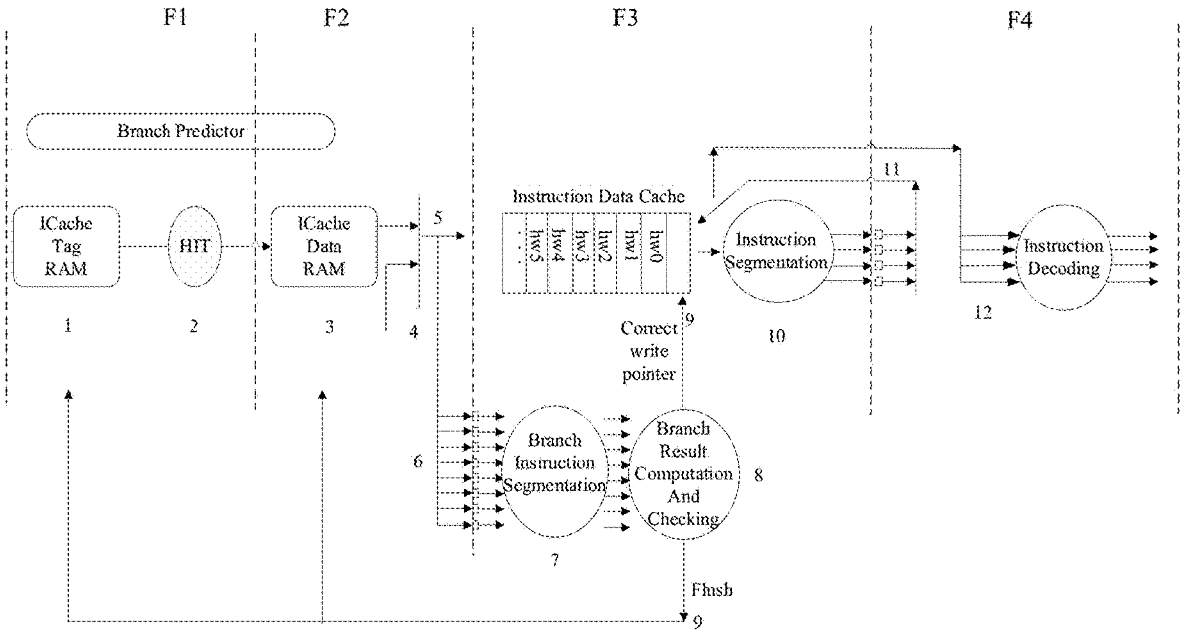
FIG. 4 is a schematic diagram of a pipeline in an example application scenario according to at least one embodiment of the present disclosure.

FIG. 4 is a schematic diagram of a pipeline in an exemplary application scenario according to at least one embodiment of the present disclosure.

In this exemplary application scenario, the following components are exemplarily added compared to the exemplary pipeline described, for example, with reference to FIG. 1:

1) an instruction segmentation and branch result computation component in parallel with the instruction data cache (e.g., corresponding to the first instruction segmentation unit and the branch result computation and checking unit, respectively, above);
2) a write pointer recovery component of the instruction data cache (e.g., corresponding to the branch result computation and checking unit above); and
3) a data path for directly reading the instruction data cache (e.g., corresponding to the data path above).

Referring to FIG. 4, pipeline phases F1-F4 are illustrated. It should be appreciated that the pipeline phases of F1-F4 is only exemplary, and in other aspects, the pipeline phases of F1-F4 may be modified. For example, some and all of the pipeline phases of F1-F4 may be combined or a pipeline phase of the pipeline of F1-F4 may be divided into a plurality of pipeline phases.

The exemplary operation flow is as follows.

1. Reading the tag random access memory of the instruction cache and getting the value of the tag in the F1 phase;
2. Comparing whether the tag random access memory hits or not, and when not, initiates a read request to the next level cache;
3. Reading the data random access memory in the F2 phase to get the instruction data when the tag random access memory hits;
4. Acquiring the instruction data from the next level cache when the read request is initiated to the next level cache. For example, the selection of data read from the next level cache and data read from the data random access memory may be realized by a multiplexer (MUX);
5. Aggregating the read instruction data to be written into the instruction data cache as an instruction stream;
6. Pipelining all the instruction streams that are written into the instruction data cache in the F2 phase to the F3 phase;
7. Segmenting the branch instruction for the instruction stream in the F3 phase to acquire one or more instructions included in the instruction stream and determining whether the one or more instructions include a branch instruction;
8. Computing and checking the branch instruction in F3, e.g., computing the correct target address of the branch instruction (e.g., corresponding to the computation target address above) and checking that the correct target address is consistent with the branch prediction target address to determine whether there is an incorrectly predicted branch instruction in the instruction stream;
9. Flushing F1 and F2 and correcting the write pointer of the instruction data cache when the incorrectly predicted branch instruction is found;
10. Reading a portion of control information of the instruction stream (corresponding to the first control information above) from the instruction data cache, and utilizing the portion of control information of the instruction stream to perform instruction segmentation in the F3 phase. Here, the instruction stream may include an instruction on the error branch (e.g., corresponding to the object instruction above), and it is sufficient to perform instruction segmentation normally and ignore the existence of the object instruction. Each instruction obtained after instruction segmentation is pipelined to the F4 phase with information about which entry (e.g., corresponding to the location information above) is to be read from the instruction data cache. In this case, instead of reading the actual instructions from the instruction data cache in the F3 phase, only the portion of control information is read for instruction segmentation, and instead of transmitting the actual instructions to the F4 phase, only the information about the entries of the instructions in the instruction data cache is transmitted.
11. In the F4 phase, instructions are read from the instruction data cache via the instruction data cache to the instruction decoder (corresponding to the decoding unit above), and when an instruction that has been flushed (e.g., in the previous phase) is read, an instruction with an invalid state is obtained.
12. Decoding the instruction using the instruction and state just read. For example, an instruction with an invalid state may be decoded as invalid, or decoding may be disabled. For example, instructions that do not have an invalid state (e.g., marked as valid or not marked) are decoded normally.

In this exemplary application scenario, detection and correction for the branch instruction prediction error can be performed earlier, thereby improving processor performance.

It is noted that the above application scenarios are only exemplary in order to facilitate the description of one or more aspects of the present disclosure in specific scenarios, but these aspects are not required and various modifications may be made to the application scenarios.

Figure 5:
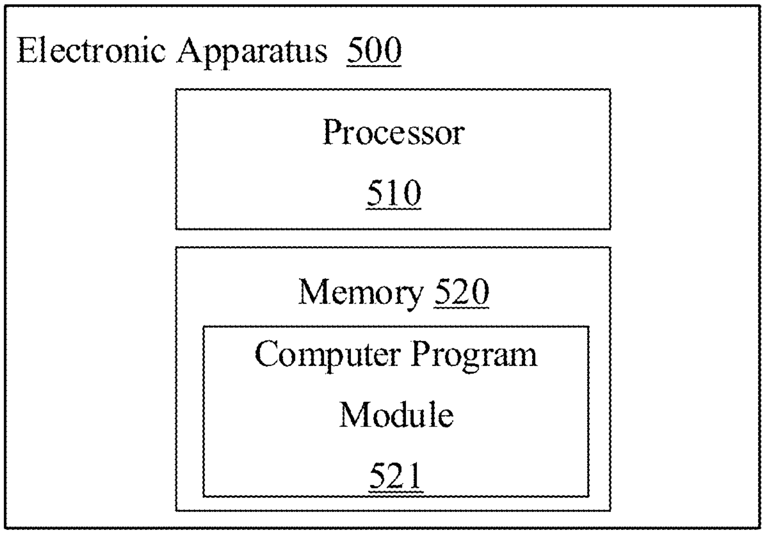
FIG. 5 is a schematic diagram of an electronic apparatus according to at least one embodiment of the present disclosure.

At least some embodiments of the present disclosure also provide an electronic apparatus. FIG. 5 is a schematic diagram of an electronic apparatus 500 according to at least one embodiment of the present disclosure.

As shown in FIG. 5, the electronic apparatus 500 includes at least one processor 510 and at least one memory 520. The memory 520 includes one or more computer program modules 521. The one or more computer program modules 521 are stored in the memory 520 and configured to be executed by the processor 510. The one or more computer program modules 521 include instructions for executing the method for processing the instruction 200 according to at least one embodiment of the present disclosure, and additional aspects thereof. When executed by the processor 510, it may perform one or more steps of the method for processing the instruction 200 according to at least one embodiment of the present disclosure, and additional aspects thereof. The memory 520 and the processor 510 may be interconnected via a bus system and/or other form of connecting mechanism (not shown). For example, the bus may be a Peripheral Component Interconnect Standard (PCI) bus or an Extended Industry Standard Architecture (EISA) bus, etc. The communication bus may be categorized as an address bus, a data bus, a control bus, etc.

For example, the processor 510 may be a central processing unit (CPU), a digital signal processor (DSP), or other forms of processing unit with data processing and/or program execution capabilities, such as a field programmable gate array (FPGA). For example, the central processing unit (CPU) may be an RISC-V architecture or other suitable type of architecture. The processor 510 may be a general-purpose processor or a specialized processor, which can control other components in the electronic apparatus 500 to perform the desired functions.

For example, the memory 520 may include any combination of one or more computer program products, which may include various forms of computer-readable storage medium, such as a volatile memory and/or a non-volatile memory. The volatile memory may include, for example, a random-access memory (RAM) and/or a cache memory. The non-volatile memory may include, for example, a read-only memory (ROM), a hard disk, an erasable programmable read-only memory (EPROM), a portable compact disc read-only memory (CD-ROM), a USB memory, a flash memory, and the like. One or more computer program modules 521 may be stored on a computer-readable storage medium, and the processor 510 may run one or more computer program modules 521 to implement various functions of the electronic apparatus 500. The computer program module includes a plurality of computer-executable instructions. In the computer-readable storage medium, various applications and data, as well as various data used and/or generated by applications, may also be stored.

The electronic apparatus 500 may include, an input apparatus including, for example, a touch screen, a touch pad, a keyboard, a mouse, a camera, a microphone, an accelerometer, a gyroscope, and the like; an output apparatus including, for example, a liquid crystal display, a speaker, a vibrator, and the like; a storage apparatus including, for example, a magnetic tape, a hard disk (HDD or SDD), and the like; and a communication apparatus including, for example, a network interface card such as a LAN card, a modem, and the like. The communication apparatus may allow the electronic apparatus 500 to communicate through the wired or wireless method with other devices to exchange data, and perform communication processing through a network such as the Internet. A drive is also connected to the I/O interface as needed. A removable storage medium, such as a disk, a CD-ROM, a magnetic disk, a semiconductor memory, and the like, are mounted to the drive as needed to allow computer programs read therefrom to be mounted into the storage apparatus as needed.

For example, the electronic apparatus 500 may further include a peripheral interface (not shown), and the like. The peripheral interface may be of various types, such as a USB interface, a lighting interface, and the like. The communication apparatus 609 may communicate with networks and other devices through wireless communication, such as the Internet, an internal network, and/or a wireless network such as a cellular telephone network, a wireless local area network (LAN), and/or a metropolitan area network (MAN). The wireless communication may use any of various communication standards, protocols, and technologies, including but not limited to the global system for the global system for mobile communications (GSM), enhanced data GSM environment (EDGE), wideband code division multiple access (W-CDMA), code division multiple access (CDMA), time division multiple access (TDMA), Bluetooth, Wi-Fi (e.g., based on the IEEE 802.11a, IEEE 802.11b, IEEE 802.11g, and/or IEEE 802.11n standards), voice over internet protocol (VOIP), Wi-MAX, protocols for e-mail, instant messaging, and/or short message service (SMS), or any other suitable communication protocol.

The electronic apparatus 500 may, for example, be a system-on-chip (SOC) or a device including the SOC. For example, the electronic apparatus may be any device such as a cell phone, a tablet computer, a laptop computer, an e-book, a game console, a television, a digital photo frame, a navigator, a household appliance, a communication base station, an industrial controller, a server and the like, or any combination of the data processing apparatus and hardware, and the embodiments of the present disclosure do not limit this. The specific functions and technical effects of the electronic apparatus 500 can be referred to the above description of the method for processing the instruction 200 according to at least one embodiment of the present disclosure and additional aspects thereof, and will not be repeated herein.

Figure 6:
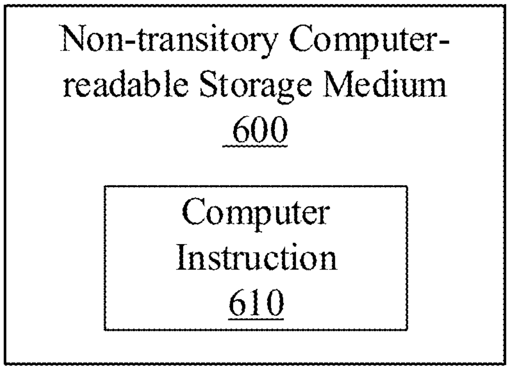
FIG. 6 is a schematic diagram of a non-transitory computer-readable storage medium according to at least one embodiment of the present disclosure.

FIG. 6 is a schematic diagram of a non-transitory computer-readable storage medium according to at least one embodiment of the present disclosure.

As illustrated in FIG. 6, the non-transitory computer-readable storage medium 600 stores computer instructions 610, the computer instructions 610 upon being executed by a processor, cause the processor to execute one or more steps of the method for processing the instruction 200 as described above.

For example, the non-transitory computer-readable storage medium 600 may be any combination of one or more computer-readable storage mediums, for example, a computer-readable storage medium includes a computer-readable program code for writing an instruction stream into an instruction data cache and a branch prediction error determination unit in parallel in an instruction processing pipeline, and determining a branch instruction in the instruction stream and whether a branch prediction error exists for the branch instruction in the branch prediction error determination unit. For another example, a computer-readable storage medium includes a computer-readable program code for, in response to the branch prediction error existing for the branch instruction, performing a flush operation on an object instruction in the instruction processing pipeline that is fetched due to the branch prediction error.

For example, when the program code is read by the computer, the computer may execute the program code stored in the computer storage medium, such as the method for processing the instruction 200 provided in any embodiment of the present disclosure, and additional aspects thereof.

For example, the non-transitory computer-readable storage medium may include a smart phone, a storage component of a tablet computer, a hard disk of a personal computer, a random-access memory (RAM), a read-only memory (ROM), an erasable programmable read-only memory (EPROM), a portable compact disk read-only memory (CD-ROM), a flash memory, or other non-transitory computer-readable storage medium or any combination of the above storage mediums.

Embodiments in the specification are described in a progressive manner. For same or similar parts between embodiments, reference may be made to each other. Each embodiment focuses on a difference from other embodiments.

It should be noted that, in the present disclosure, the relational terms such as "first", "second", and the like, are only used to distinguish one entity or operation from another entity or operation, and are not intended to require or imply the existence of any actual relationship or order between these entities or operations. Furthermore, the terms "comprise/comprising", "include/including", or any other variations thereof are intended to cover a non-exclusive inclusion such that a process, method, article, or device that includes a list of elements includes not only those elements, but also other elements not expressly listed, or elements inherent to the process, method, article, or device. Without further limitation, an element qualified by the statement "comprises/includes . . . " does not exclude the presence of additional identical elements in the process, method, article, or device that includes the element.

There are also the following points to be made for the present disclosure:

(1) The drawings of the embodiments of the present disclosure relate only to the structures involved with the embodiments of the present disclosure, and other structures can be referred to as the usual designs.

(2) Without conflict, the embodiments and features in the embodiments of the present disclosure may be combined with each other to obtain new embodiments.

The foregoing are merely exemplary embodiments of the present disclosure and are not intended to limit the scope of protection of the present disclosure, which is defined by the claims.

The invention claimed is:

1. A method for processing an instruction, comprising:

writing an instruction stream into an instruction data cache and a branch prediction error determination unit in parallel in an instruction processing pipeline, and determining a branch instruction in the instruction stream and whether a branch prediction error exists for the branch instruction in the branch prediction error determination unit; and in response to the branch prediction error existing for the branch instruction, performing a flush operation on an object instruction in the instruction processing pipeline that is fetched due to the branch prediction error, wherein the method further comprises:

performing a second instruction segmentation on the instruction stream written into the instruction data cache to obtain a second set of instructions; and reading the second set of instructions and in response to the second set of instructions comprising the object instruction, blocking an execution of the object instruction.

2. The method according to claim 1, wherein the determining a branch instruction in the instruction stream and whether a branch prediction error exists for the branch instruction comprises:

performing a first instruction segmentation on the instruction stream written into the branch prediction error determination unit to obtain a first set of instructions;

in response to the branch instruction existing in the first set of instructions, computing a computation target address of the branch instruction, and checking whether the computation target address is consistent with a branch prediction target address for the branch instruction; and in response to the computation target address being inconsistent with the branch prediction target address, determining that the branch prediction error exists for the branch instruction.

3. The method according to claim 2, wherein the computing a computation target address of the branch instruction comprises:

computing the computation target address based on instruction jump information of the branch instruction.

4. The method according to claim 1, further comprising:

in response to the branch prediction error existing, correcting a write pointer of the instruction data cache to move the write pointer to a location of the object instruction in the instruction data cache.

5. The method according to claim 1, wherein the performing a second instruction segmentation on the instruction stream written into the instruction data cache to obtain a second set of instructions comprises:

reading first control information of the instruction stream from the instruction data cache;

performing an instruction segmentation on the instruction stream based on the first control information to obtain location information in the instruction data cache for each instruction in the second set of instructions; and providing the location information to enable reading the second set of instructions from the instruction data cache based on the location information for decoding.

6. The method according to claim 5, wherein the in response to the second set of instructions comprising the object instruction, blocking an execution of the object instruction comprises:

reading the second set of instructions from the instruction data cache based on the location information via a data path from the instruction data cache to a decoding unit;

in response to the second set of instructions comprising the object instruction, marking the object instruction as an invalid state; and in response to the invalid state, disabling a decoding operation for the object instruction or decoding the object instruction as an invalid instruction.

7. The method according to claim 1, further comprising:

in response to the second set of instructions not comprising the object instruction, continuing an execution of each instruction in the second set of instructions.

8. The method according to claim 1, further comprising:

performing an instruction fetch operation to acquire the instruction stream in the instruction processing pipeline.

9. The method according to claim 8, wherein the performing an instruction fetch operation to acquire the instruction stream comprises:

in response to receiving an instruction acquisition request, based on a tag part of a destination address comprised in the instruction acquisition request, querying a tag memory of an instruction cache to determine whether the tag part hits the tag memory;

in response to the tag part hitting the tag memory, reading instruction data corresponding to the instruction acquisition request from a data memory of the instruction cache as the instruction stream; or in response to the tag part not hitting the tag memory, reading instruction data corresponding to the instruction acquisition request from a main memory or a next level cache.

10. The method according to claim 1, wherein the instruction stream comprises a plurality of non-fix length instructions.

11. A processor, comprising an instruction data cache, an instruction stream transmitter, and a branch prediction error determination unit, wherein the instruction stream transmitter is configured to write an instruction stream into the instruction data cache and the branch prediction error determination unit in parallel in an instruction processing pipeline; and the branch prediction error determination unit is configured to:

determine a branch instruction in the instruction stream and whether a branch prediction error exists for the branch instruction; and in response to the branch prediction error existing for the branch instruction, perform a flush operation on an object instruction in the instruction processing pipeline that is fetched due to the branch prediction error, wherein the processor is further configured to:

perform a second instruction segmentation on the instruction stream written into the instruction data cache to obtain a second set of instructions; and read the second set of instructions and in response to the second set of instructions comprising the object instruction, block an execution of the object instruction.

12. The processor according to claim 11, wherein the branch prediction error determination unit is configured to:

perform a first instruction segmentation on the instruction stream written into the branch prediction error determination unit to obtain a first set of instructions; and in response to the branch instruction existing in the first set of instructions, compute a computation target address of the branch instruction, and check whether the computation target address is consistent with a branch prediction target address for the branch instruction, and in response to the computation target address being inconsistent with the branch prediction target address, determine that the branch prediction error exists for the branch instruction.

13. The processor according to claim 11, wherein the branch prediction error determination unit is further configured to:

in response to the branch prediction error existing, correct a write pointer of the instruction data cache to move the write pointer to a location of the object instruction in the instruction data cache.

14. The processor according to claim 11, wherein the processor is further configured to:

read first control information of the instruction stream from the instruction data cache;

perform an instruction segmentation on the instruction stream based on the first control information to obtain location information in the instruction data cache for each instruction in the second set of instructions; and provide the location information to enable reading the second set of instructions from the instruction data cache based on the location information for decoding.

15. The processor according to claim 14, wherein the processor is further configured to:

read the second set of instructions from the instruction data cache based on the location information via a data path from the instruction data cache to a decoding unit;

in response to the second set of instructions comprising the object instruction, mark the object instruction as an invalid state; and in response to the invalid state, disable a decoding operation for the object instruction or decode the object instruction as an invalid instruction.

16. The processor according to claim 11, wherein the processor is further configured to:

in response to the second set of instructions not comprising the object instruction, continue an execution of each instruction in the second set of instructions.

17. An electronic apparatus, comprising:

at least one processor;

at least one memory storing one or more computer program modules, wherein the one or more computer program modules are configured to be executed by the at least one processor to implement a method for processing an instruction, and the method comprises:

writing an instruction stream into an instruction data cache and a branch prediction error determination unit in parallel in an instruction processing pipeline, and determining a branch instruction in the instruction stream and whether a branch prediction error exists for the branch instruction in the branch prediction error determination unit; and in response to the branch prediction error existing for the branch instruction, performing a flush operation on an object instruction in the instruction processing pipeline that is fetched due to the branch prediction error, wherein the method further comprises:

performing a second instruction segmentation on the instruction stream written into the instruction data cache to obtain a second set of instructions; and reading the second set of instructions and in response to the second set of instructions comprising the object instruction, blocking an execution of the object instruction.

18. A non-transitory computer-readable storage medium storing computer executable instructions, wherein the computer executable instructions, upon being executed by one or more processors, implement the method according to claim 1.

* * * * *